US011162506B2

(12) United States Patent
Morreale et al.

(10) Patent No.: US 11,162,506 B2
(45) Date of Patent: Nov. 2, 2021

(54) FAN MODULE HAVING VARIABLE-PITCH BLADES FOR A TURBINE ENGINE

(71) Applicant: SAFRAN AIRCRAFT ENGINES, Paris (FR)

(72) Inventors: Serge Rene Morreale, Guignes (FR); Yanis Benslama, Paris (FR); Jeremy Dievart, Paris (FR); Dominik Igel, Hericy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 163 days.

(21) Appl. No.: 16/068,102

(22) PCT Filed: Dec. 22, 2016

(86) PCT No.: PCT/FR2016/053645
§ 371 (c)(1),
(2) Date: Jul. 3, 2018

(87) PCT Pub. No.: WO2017/118792
PCT Pub. Date: Jul. 13, 2017

(65) Prior Publication Data
US 2019/0003484 A1    Jan. 3, 2019

(30) Foreign Application Priority Data

Jan. 5, 2016 (FR) ...................... 1650022

(51) Int. Cl.
*F04D 29/36* (2006.01)
*F01D 7/00* (2006.01)
(Continued)

(52) U.S. Cl.
CPC .......... *F04D 29/362* (2013.01); *B64C 11/385* (2013.01); *F01D 7/00* (2013.01);
(Continued)

(58) Field of Classification Search
CPC .... F05D 2220/36; F05D 2270/64; F01D 7/02; F01D 7/00; F04D 29/323; F04D 29/362; F02C 9/58; F02K 3/06
See application file for complete search history.

(56) References Cited

U.S. PATENT DOCUMENTS 3,873,236 A * 3/1975 Gall .......................... F01D 7/00
416/162
3,922,852 A    12/1975 Drabek
(Continued)

FOREIGN PATENT DOCUMENTS

FR    2248415 A1    5/1975
FR    2980770 B1    6/2014
(Continued)

OTHER PUBLICATIONS

International Search Report and Written Opinion received for PCT Patent Application No. PCT/FR2016/053645, dated Apr. 19, 2017, 16 pages (8 pages of English Translation and 8 pages of Original Document).

*Primary Examiner* — Courtney D Heinle
*Assistant Examiner* — Andrew Thanh Bui
(74) *Attorney, Agent, or Firm* — Womble Bond Dickinson (US) LLP

(57) ABSTRACT

The invention relates to a fan module having variable-pitch blades for a turbine engine, including a rotor (2) having blades (3), a stationary casing (7), and a system for adjusting and controlling the pitch of the blades (3), the rotor (2) including a central shaft (6) and a ring (9) for supporting the blades surrounding the shaft, a front end of the ring being connected to a front end of the shaft so as to define an annular space between the ring and the shaft which is open towards the rear, said annular space of the rotor (2) housing said system, and the shaft (6) being guided by a first bearing (8) mounted in the stationary casing (7), to the rear of the (Continued)

ring (9), characterised in that the ring (9) is guided by at least one complementary bearing (31) located upstream of the first bearing (8).

15 Claims, 4 Drawing Sheets

(51) Int. Cl.
*B64C 11/38* (2006.01)
*F04D 29/32* (2006.01)
*F04D 29/059* (2006.01)
*F01D 25/16* (2006.01)
*F02K 3/00* (2006.01)
*F04D 29/056* (2006.01)

(52) U.S. Cl.
CPC ............... *F01D 25/16* (2013.01); *F02K 3/00* (2013.01); *F04D 29/056* (2013.01); *F04D 29/059* (2013.01); *F04D 29/323* (2013.01); *F04D 29/325* (2013.01); *F05D 2220/36* (2013.01); *F05D 2240/14* (2013.01); *F05D 2240/20* (2013.01); *F05D 2240/54* (2013.01); *F05D 2260/74* (2013.01); *F05D 2260/76* (2013.01); *F05D 2260/79* (2013.01); *F05D 2270/64* (2013.01); *Y02T 50/60* (2013.01)

(56) References Cited

U.S. PATENT DOCUMENTS

| 4,718,823 | A | * | 1/1988 | Dennison | .................. | F01D 7/00 |
| | | | | | | 416/162 |
| 4,934,140 | A | * | 6/1990 | Dennison | .................. | F02C 7/20 |
| | | | | | | 60/226.1 |
| 9,849,970 | B2 | * | 12/2017 | Escure | .................... | F02C 3/067 |
| 10,364,020 | B2 | * | 7/2019 | Curnock | .................. | B64C 11/32 |
| 2014/0205457 | A1 | | 7/2014 | Curlier et al. | | |
| 2017/0138207 | A1 | * | 5/2017 | Niergarth | .................. | F01D 7/00 |

FOREIGN PATENT DOCUMENTS

| FR | 3001264 | A1 | 7/2014 |
| FR | 3009710 | B1 | 4/2017 |
| GB | 0820106 | A | 9/1959 |

* cited by examiner

FAN MODULE HAVING VARIABLE-PITCH BLADES FOR A TURBINE ENGINE

TECHNICAL FIELD

The invention relates to a turbine-engine fan having blades with a variable pitch. It relates more particularly to the holding of the rotor of this fan.

PRIOR ART

The variable pitch of the blades of a turbine-engine fan is one of the ways for improving the performance thereof under various flight conditions. Variable pitch may also be advantageous for placing the blades in a position where they are in a feathered position, that is to say they do not exert any thrust on the air despite the rotation of the fan, and then in a position where the thrust of the fan is reversed, without changing its direction of rotation. The feathered position corresponds to an intermediate position of the pitch angle of the blades between propulsion and thrust-reversal modes.

In order to achieve a variable pitch of the blades, it is possible to use the solution described, for example, in the patent FR-B1-3009710 of the applicant. In this case, the blades are mounted so as to pivot about radial axes on a ring supporting the fan rotor. A linkage system can control the pivoting of the blades, for example by acting on pairs of conical pivots or on connecting rods. The movement of the linkages can itself be driven by a hydraulic cylinder. The following documents also relate to fan modules having variable-pitch blades: FR 2 248 415, GB 820 106, FR 2 980 770 and FR 3 001 264.

The devices for adjusting and controlling the pitch of the blades introduce mechanisms that have a certain bulk and a certain mass. This makes it more difficult to hold the fan rotor in front of the turbine-engine casing.

In addition, the functioning of the variable-pitch mechanisms may be affected if the holding of the fan rotor is not sufficiently rigid, and these mechanisms comprise connections between parts with various diameters or stator and rotor parts.

There therefore exists a need to define fan modules having variable-pitch blades enabling the rotor to be held with sufficient rigidity.

PRESENTATION OF THE INVENTION

The invention relates to a fan module having variable-pitch blades for a turbine engine, comprising a rotor carrying blades, a fixed casing and a system for adjusting and controlling the pitch of the blades, the rotor comprising a central shaft and a ring supporting the blades surrounding the shaft, a front end of the ring being connected to a front end of the shaft so as to define, between the ring and the shaft, an annular space open towards the rear, said annular space of the rotor housing said system and the shaft being guided by a first bearing mounted in the fixed casing, behind the ring, the ring being guided by at least one complementary bearing situated upstream of the first bearing and the system for adjusting and controlling the pitch of the blades comprising an actuator mounted on the fixed casing, a housing of which supports, on its external radial wall, an inner track of said complementary bearing connecting the external radial wall of the housing.

In the document, the terms "front" and "rear", for determining the position of parts with respect to one another, refer to the direction of normal travel of the turbine engine in operation in the air.

The holding of the ring by at least one bearing situated upstream of the first bearing and holding the support ring by the rear, which forms the return of the kind of "pin", formed by the rotor around the system for adjusting and controlling the pitch of the blades, makes it possible to hold the rotor radially with good rigidity. This good holding limits the clearances in the referential-system passage bearings between fixed parts and rotating parts of the variable-pitch control system that are situated in the annular space. This also makes it possible to reduce the sizing constraints on the variable-pitch control system.

Moreover, positioning the complementary bearing in front of the first bearing makes it possible to limit the rearward extension of the rotor, and therefore to limit the rotating mass.

Advantage is taken of the presence of the actuator fixed to the casing in order to install thereon the complementary bearing, which represents a saving in mass. Moreover, the connection between the rotor and the casing being made as close as possible to the system for adjusting and controlling the pitch of the blades, the rigidity in this system is improved.

Another aspect of such a configuration is that the clearance at the tip of the fan blades is limited.

Preferably, the housing is mounted on the same part of the fixed casing as the first bearing. There is thus a gain in compactness of the assembly.

The system for adjusting and controlling the pitch of the blades may comprise a mechanism for adjusting the pitch of the blades connected to the fan rotor, a control means comprising the actuator and a control part able to move in translation along a rotation axis of the rotor, and a bearing transferring load between the control part and said mechanism.

Advantageously, the load-transfer bearing is situated at the rear of the blades.

The piston drives an annular part extending axially in front of the housing.

Advantageously, the annular part carries the inner track of the load-transfer bearing, allowing the rotation, about this annular part, of a ring connected to the fan rotor, and said ring carries the outer track of the load-transfer bearing. In this way, the axial movement of the annular part axially drives the ring while enabling it to turn with the rotor.

The load-transfer bearing is the place where a clearance may be situated between the fixed parts and the rotating parts. This position limits these clearances.

Preferably, the diameter of the complementary bearing is no more than the diameter of the ring. In this way the inertia of the rotating masses connected to this bearing are limited.

The complementary bearing is disposed axially between the first bearing and the load-transfer bearing.

Preferably also, the diameter of the complementary bearing is greater than the diameter of the first bearing. In this way the fixed casing is inserted at the rear of the rotor and the larger diameter of the complementary bearing with respect to the first bearing improves the rigidity of this connection.

Advantageously, a fixed track supports elastic return means arranged so as to exert an axial return force on the control part towards a given position, preferably corresponding to the feathering of the blades.

Preferably, the fixed track is fixed to the housing. When the housing also supports the complementary bearing, high integration of the system for adjusting and controlling the pitch of the blades with the means holding the rotor is achieved, which participates in the compactness of the fan module.

Preferably, the control part slides around the fixed track. This participates in the holding of the load-transfer bearing and in the limitation of clearances.

Preferably, but non-limitatively, the fan module is disposed upstream of the turbine engine.

BRIEF DESCRIPTION OF THE DRAWINGS

The present invention will be understood better and other details, features and advantages of the present invention will emerge more clearly from a reading of the following description with reference to the accompanying drawings, in which.

DESCRIPTION OF AN EMBODIMENT OF THE INVENTION

Figure 1:
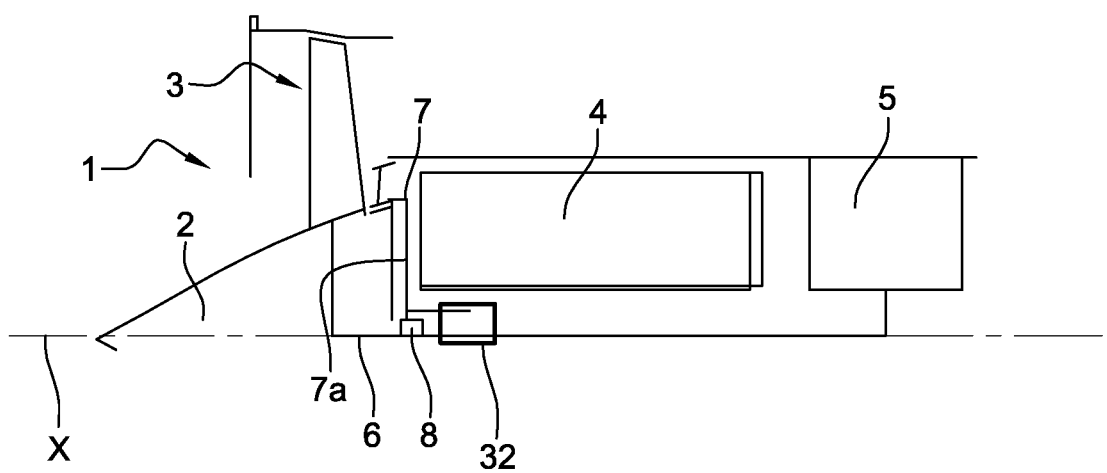
FIG. 1 shows schematically a turbine engine using the invention.

The invention relates for example to a turbine engine such as the one shown schematically in FIG. 1. It comprises a fan 1 comprising a rotor 2 carrying a series of blades 3. The fan 1 is generally faired. The fan 1 is here placed in front of the driving part of the turbine engine, which comprises successively a gas generator 4 and a power generator 5 that drives the shaft 6 of the rotor 2 of the fan. The fan 1 here turns about an axis X that is also the rotation axis of the elements of the driving part and is generally situated in front of a fixed casing 7 surrounding the driving part. The shaft 6 of the rotor passes through the fixed casing 7 and is held axially to the passage of the latter by a bearing 8. The shaft 6 is moreover rotated by a shaft connected to the power turbine, not shown, through a reduction gear 32. In other words, the bearing is mounted between the support 7a of the casing 7 and the shaft 6 downstream of a system for adjusting the pitch of the blades.

The rotor 2 is situated in front of a fixed casing 7 of the turbine engine. The bearing 8 is preferably arranged to hold the shaft 6 both radially and axially. For this reason, these bearings are preferably ball bearings. Moreover, the bearing 8 is mounted here on a support part 7a of the casing 7, close to the reduction gear 32.

Figure 2:
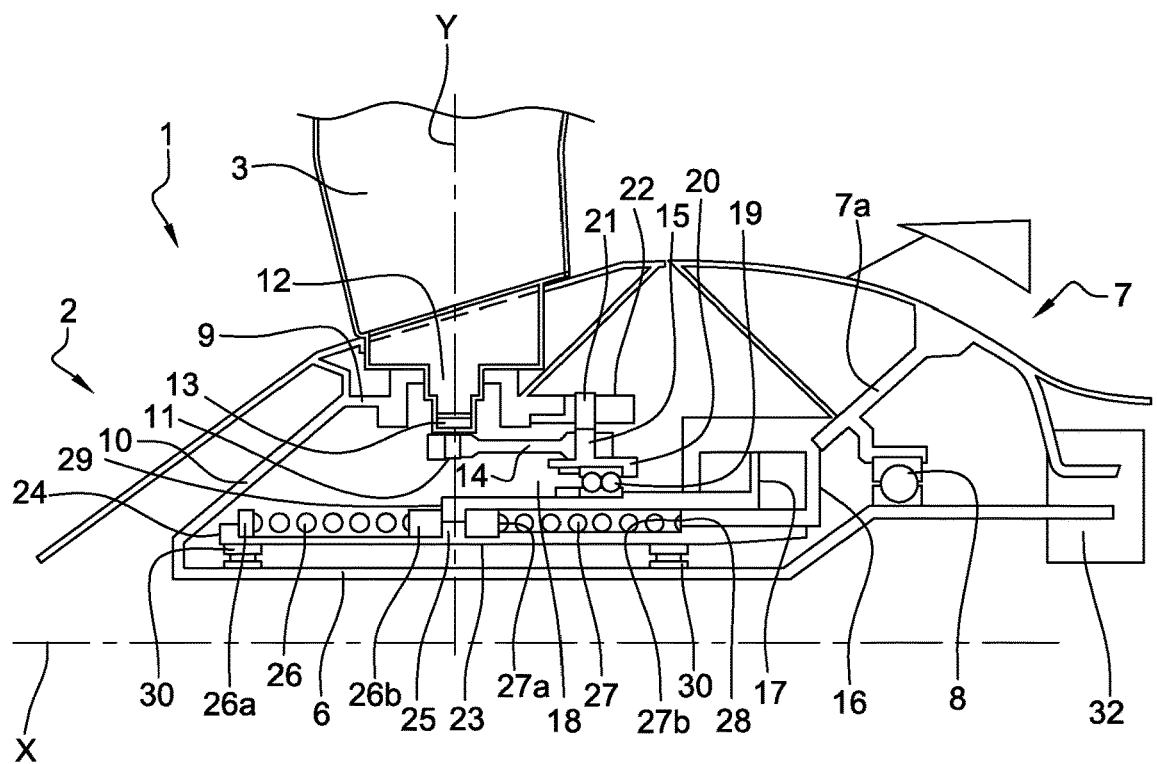
FIG. 2 shows a schematic axial section of a first embodiment of a device for adjusting the pitch of the rotor blades according to the invention, in the feathering position of the blades.

According to a first embodiment, with reference to FIG. 2, in this configuration the rotor 2 also comprises a ring 9 supporting the blades 3, situated in front of the bearing 8. The front of the support ring 9 is connected to the front of the rotor 2 by a substantially frustoconical part 10 and the assembly is configured so that an interior free space is provided in front of the bearing 8, between the support ring 9 and the shaft 6.

A blade 3, as shown in FIG. 2, is mounted on the support ring so as to be able to rotate about a substantially radial axis Y, for example by means of a rolling bearing, not shown. The blade 3 comprises a shaft 12 centred on the axis Y that projects radially beyond the support ring 9 in the internal free space.

Figure 3:
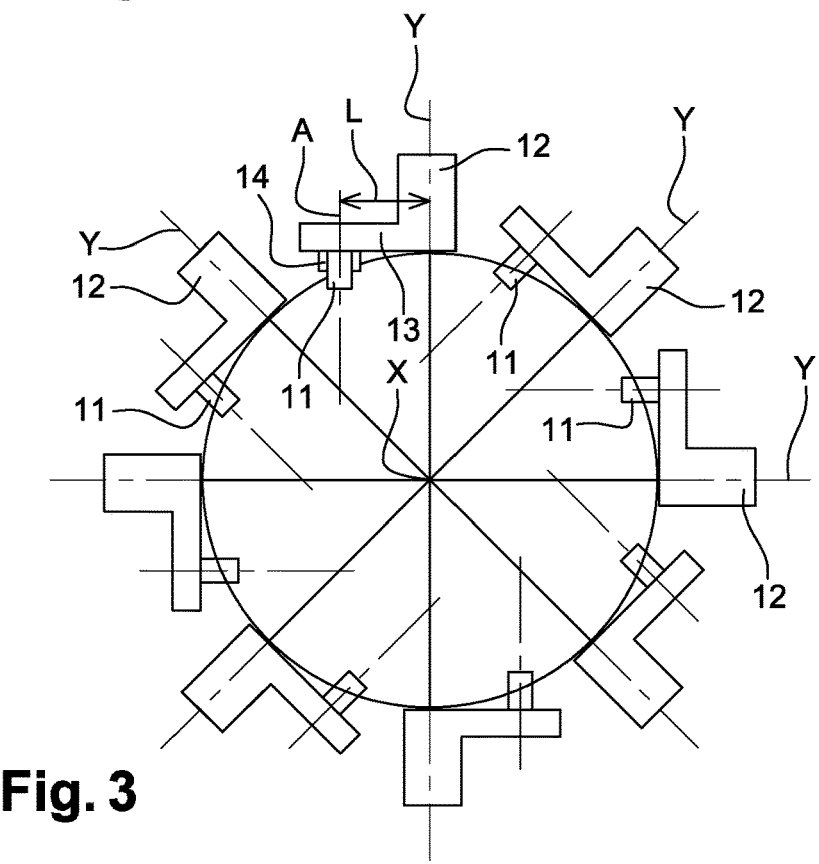
FIG. 3 shows a schematic front view of the linkages controlling the pitch angle of the blades for a device according to the invention.

With reference to FIGS. 2 and 3, a crank 13 secured to the pivot shaft 12 of the blade 3 is disposed substantially perpendicular to the latter in a plane transverse to the axis X of the rotor 2. Moreover, a substantially axial connecting rod 14 is mounted so to pivot on a stud 11 at point A on the crank 13 in a direction substantially parallel to the axis Y of the pivot shaft 12. The end of the pivot shaft 12, the crank 13 and the stud 11 can form, in a single piece, an arm for rotating the blade.

In this way, an axial translation of the connecting rod 14 makes it possible to exert a lever arm of length L, equal to the distance between the connecting point A and the axis Y of the pivot shaft 12, in order to rotate the blade 3 about the axis Y. The example in FIG. 3 thus shows eight shafts 12 for the fan blades, regularly distributed over the circumference of the ring 9. The crank 13 can extend in the space separating two successive pivot shafts 12, in order to provide the lever arm L.

Moreover, the connecting rod 14 extends here towards the rear and comprises, at its rear end, a head having an orifice in which there is engaged a stud 15 to push it forwards or to push it backwards. Depending on the axial position of the stud 15, the pitch angle of each blade 3 can thus vary around an average position corresponding to feathering, in order to be situated either in a thrust position or in a thrust-reversal position.

The device is supplemented by an axial cylinder used for axially moving the studs 15 passing through the heads of the connecting rods 14. The axial cylinder comprises a housing 16 fixed to the casing 7 and placed in the free internal space of the rotor 2. The housing 16 forms a chamber inside which a piston 17, which drives an annular part 18 extending axially in front of the housing 16, can move. Advantageously, the housing 16 and the piston 17 are also annular around the axis X of the rotor 2. The position of the piston 17 is obtained by a difference in oil pressure on either side of the piston 17 inside the chamber of the housing 16, which is controlled by a control circuit, not shown in the figure. As in the prior art described previously, this control circuit comprises, in a known manner, servo control means for adjusting the oil pressure arriving at the cylinder in order to obtain a defined movement of the piston 17. It should be noted however that, contrary to this prior art, it is not necessary to introduce a dynamic seal in the oil circuit since the housing 16 of the cylinder is fixed to the casing 7.

The annular part 18 driven by the piston 17 moreover carries the inner track of a load-transfer bearing 19, allowing the rotation, about this part 18, of a ring 20 connected to the fan rotor 2. The outer track of the bearing 19 is fixed to this ring 20, just as the inner track is fixed to the annular part 18. In this way, the axial movement of the annular part 18 axially drives the ring 20 while enabling it to turn with the rotor 2.

Moreover, the ring 20 supports the studs 15 arranged so as to be inserted in the heads of the connecting rods 14, in order to move them axially. In this way, the movement of the piston 17 of the cylinder is transmitted to the connecting rods 14 and makes each blade 3 rotate about its pitch axis Y.

Preferably, the ring 20 also comprises at least one rod 21 that projects radially in order to be inserted in an axial runner 22 connected to the ring 9 supporting the blades 3. This makes it possible to fix the position of the ring 20 in azimuth with respect to the rotor 2, transmitting the circumferential forces between the rotor 2 and the ring 20 without interfering with the mechanism for moving the connecting rods 14. A fixed annular track 23, substantially tubular and around which the movable annular part 18 slides, is moreover fixed to the internal radial periphery of the housing 16 and extends axially forwards, along the shaft 6 of the rotor. The forward axial extension of this fixed annular track 23 is greater than that of the movable annular part 18 driven by the piston. Preferably, the fixed annular track 23 passes through the pitch axis Y of the blades 3 and extends substantially as far as the junction of the shaft 6 and frustoconical part 10, without touching them.

Moreover, the fixed annular track 23 comprises a first flange 24 projecting radially from its external periphery at its front end and a second flange 25 also projecting radially from its external periphery, substantially half way between the front radial wall 28 of the chamber 16 and the first flange. A first cylindrical spring 26 is installed around the external periphery of the fixed annular track 23. This spring is arranged between the first flange 24 and the second flange 25. It comprises stops at its ends 26a, 26b that make it possible to contain it between the flanges 24, 25. A second cylindrical spring 27 is installed around the external periphery of the fixed annular track 23, between the second flange 25 and the front wall 28 of the housing 16 of the cylinder, which forms an axial stop on the fixed annular track 23. The second spring 27 also comprises a stop 27a at its front end, the rear stop 27b being formed by the front wall 28 of the housing 16. The second spring is situated radially between the fixed annular track 23 and the movable annular part 18.

The movable annular part 18 driven by the piston 17 is, for its part, sized so as to slide axially between said springs 26, 27 without touching them. The annular part 18, however, comprises at its front end, a flange 29 projecting radially inwards, so as to be able to axially push on the stop of the rear end 26b of the first spring 26 and the stop of the front end 27a of the second spring 27. In FIG. 2, the movable annular part 18 is situated in an intermediate position where its end flange 29 comes to be housed between the rear stop 26b of the first spring 26 and the front stop 27a of the second spring 27, above the second flange 25 of the fixed annular part 18. In order to avoid beating of blades during feathering in the case of failure of the cylinder, the flanges 25 and 29 must have the same thickness, to within the machining tolerances.

A radial superimposition of the feathering system with the blade pitch movement transformation system is obtained, and there is space to, if necessary, increase the diameter of the cylinder.

The module also comprises at least one complementary bearing 30 for guiding the shaft. In the example shown, the module comprises two complementary bearings 30 making it possible to hold the rotor by the shaft 6 in the annular track 23, the small bearings, that is to say with a smaller radius than the bearing 8, affording a reduced space requirement. The space available for the cylinder is optimised by superimposing the bearings 30 and the device providing the blade pitch movement transformation and the feathering return.

It can be noted that, if use is made of a static cylinder, in particular non-hydraulic, for actuating the axial movement of an annular movable part 18 for a system for adjusting the pitch of blades 3 similar to that described previously, and it is therefore not necessarily required to install the return system, it is possible all the same to use this configuration for installing a fixed annular track 23 supporting the bearings. According to the actuator system used, this fixed annular track 23 may be secured to a housing containing the actuator, fixed to the structure part 7a holding the first bearing 8, or be formed by the housing itself, if it extends sufficiently in front of the first bearing 8.

Moreover, it may be noted that the heads of the connecting rods 14 are behind the shaft 12 of the blades 3. Their length is arranged so that, when the movable annular part 18 is in the intermediate position described above, its front stop 29 being situated substantially facing the second stop 25 of the fixed annular track 23, the ring 20 is situated in a position close to the housing 16 of the cylinder while enabling it to retract. This intermediate position of the ring 20 contributes to the rigidity of the assembly.

In addition, in the example in FIG. 3, the fixed annular track 23 is connected to the shaft 6 of the rotor by one or more central complementary bearings 30 distributed over its length. The rotor 2, comprising the shaft 6, the conical connecting part 10 and the support ring 9, comprises a kind of pin inserted in the annular track 23 and surrounding the stator consisting of the fixed actuator. Moreover, the substantially tubular form of the annular track 23 contributes to its rigidity.

The pin formed by the rotor 2 is held by the inside, along the shaft 6, by the bearing 8 close to the reduction gear 32 and by the central bearings 30 along the annular track 23. In other words, the bearings 30 are arranged radially between the shaft 6 and the fixed annular track 23 and axially upstream of the bearing 8. In particular, a first central bearing 30 is disposed upstream of the blades and a second central bearing 30 is disposed downstream of the blades. This configuration improves the transverse holding of the rotor 2 by distributing the forces over the length of the fixed annular track 23, from the first central bearing 30 disposed on the casing at the chamber of the hydraulic cylinder as far as the second central bearing 30, in the example situated close to the front of the pin of the rotor 2.

More precisely still, the outer race of the bearings 30 is carried by the annular track 23 and the inner race is carried by the shaft 6.

It will be noted that here, unlike the first bearing 8, the central bearings 30 have a diameter smaller than that of the bearing 8. This is because these bearings 30 do not need to provide axial holding and advantageously have smaller rollers. They may also be formed by rolling bearings and thus avoid axially overstressing the rotor 2.

The holding of the rotor provided by the central bearings 30 makes it possible to dispense with external bearings holding the rotor on the fixed casing 7, at the periphery of the bearing 8. This configuration helps to minimise the structural mass, in particular the rotating mass of the structure of the rotor serving to hold it.

The holding of the rotor 2 at its shaft 6 frees up space outside the ring 9. It is thus possible to give a larger radius to the ring 9 supporting the blades. In addition, the stiffening of the connection between the cylinder and the rotor 2 by means of the central bearings 30 makes it possible to reduce the clearances at the bearing 19 transferring load to the ring 20 controlling the connecting rods 14.

The stiffening of the assembly and the space available for increasing the diameter of the support ring 9 make it possible to move the connecting rods 14 away from the axis X of the rotor 2. As can be seen in FIG. 3, the distance available between two pivot shafts 12 for a given angular separation is proportional to the radius at which the connecting rods 14 are situated, at the base of the pivot shaft 12. It is therefore possible either to increase the number of blades 3 on the fan 1 or, for a constant number of blades 3, to increase the lever arm L and thus to be less demanding as to the sizing of the hydraulic cylinder and its control circuit.

Figure 4:
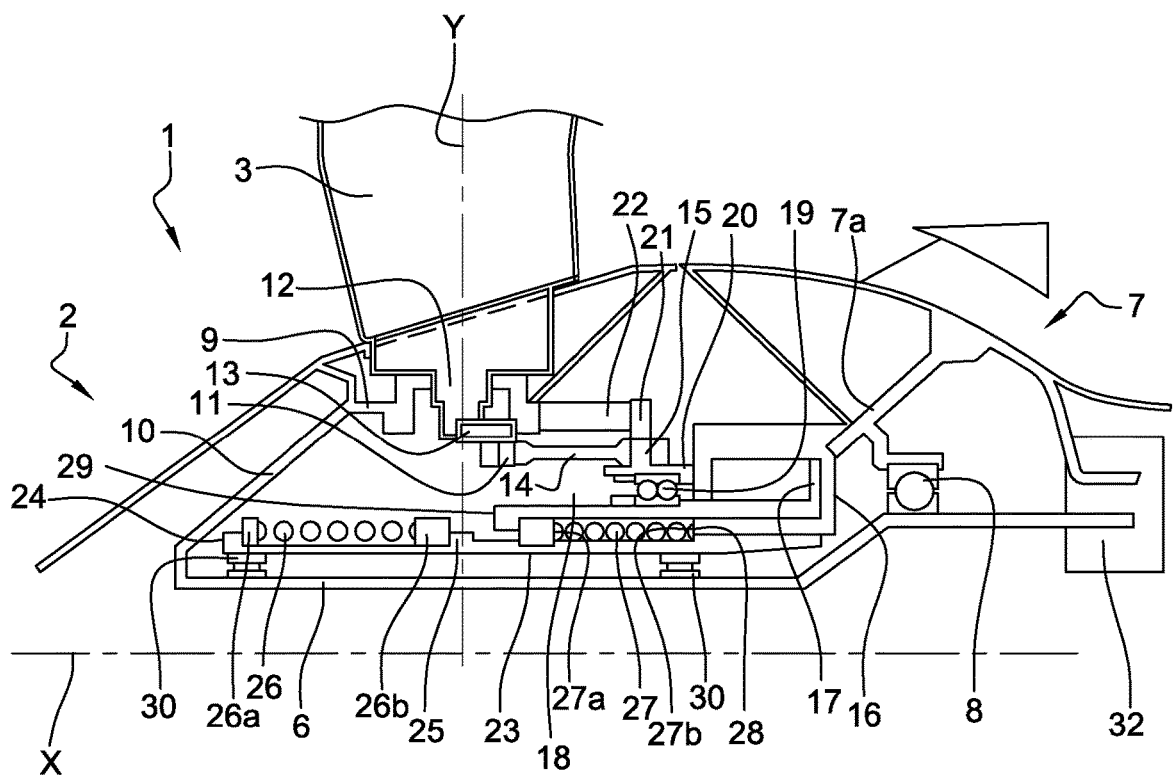
FIG. 4 shows a schematic axial section of the first embodiment corresponding to FIG. 3, in the propulsion position of the blade.

The system for adjusting the pitch of the blades 3 thus described functions as follows:

With reference to FIG. 4, when the piston 17 of the cylinder moves backwards, it causes the rotation of the blades 3 so that their pitch corresponds to the propulsion mode. Moreover, the front stop 29 of the movable annular part 18 compresses the second spring 27 against the stop formed by the front wall of the housing 16, while the first spring 26 remains contained between the first flange 24 and the second flange 25 of the fixed annular track 23, without interacting with the movable annular part 18. If a fault occurs in the hydraulic control system and the cylinder becomes inoperative, the return force exerted by the second spring 27 makes the movable annular part 18 advance as far as the intermediate position, corresponding to FIG. 3, where its front flange 29 is facing the second flange 25 of the fixed annular track 23, the two springs 26, 27 having their ends 26b, 27a in abutment on this second flange 25. The intermediate position of the movable annular part 18 having been designed so that it corresponds to the pitch angle of the feathered position of the blades 3, the system fulfils its safety role when the fan 1 is in propulsion mode.

Figure 5:
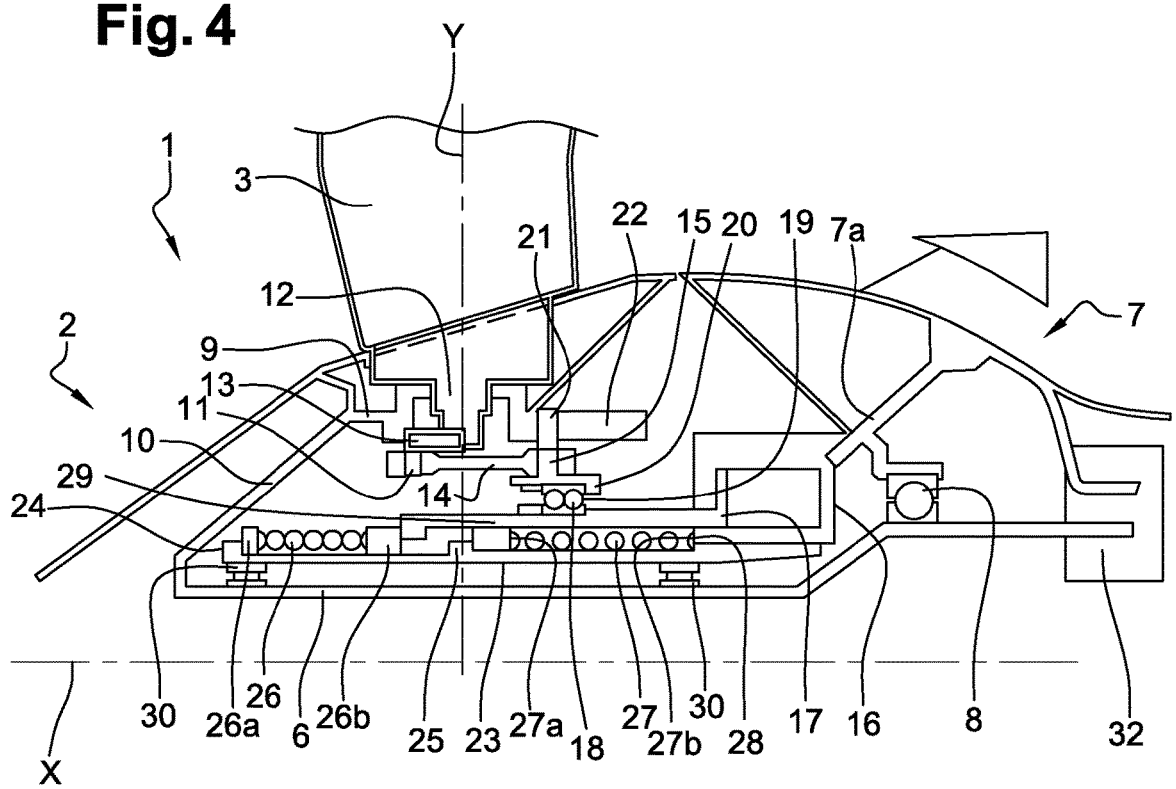
FIG. 5 shows a schematic axial section of the first embodiment corresponding to FIG. 3 in the thrust-reversal position of the blades.

Symmetrically, with reference to FIG. 5, when the piston 17 of the cylinder moves forwards, it causes the rotation of the blades 3 so that their pitch corresponds to the thrust-reversal mode. Moreover, the front stop 29 of the movable annular part 18 compresses the first spring 26 against the first stop 24 of the fixed annular track 23, while the second spring 27 remains contained between the second flange 25 of the fixed annular track 23 and the front transverse wall of the housing 16, without interacting with the movable annular part 18. If a fault occurs in the hydraulic control system and the cylinder becomes inoperative, the return force exerted by the first spring 26 makes the movable annular part 18 retract as far as the intermediate position, corresponding to FIG. 3, where its front flange 29 is facing the second flange 25 of the fixed annular track 23, the two springs 26, 27 having their ends 26b, 27a in abutment on this second flange 25. In this way, the system also fulfils its safety role when the fan 1 is in thrust-reversal mode.

It will be noted that, in the two situations, the springs 26, 27 naturally return the movable part 18 to one and the same neutral position that corresponds to feathering.

Moreover, each spring 26, 27 acts independently of the other according to the operating mode. The two springs can therefore be sized independently of one another in order to optimise their return forces so as to adapt the dynamics of the feathering of the blades 3 to the propulsion mode on the one hand and to the thrust-reversal mode on the other hand. In particular, they must be more powerful than the aerodynamic forces applied to the blades 3 of the fan.

Figure 6:
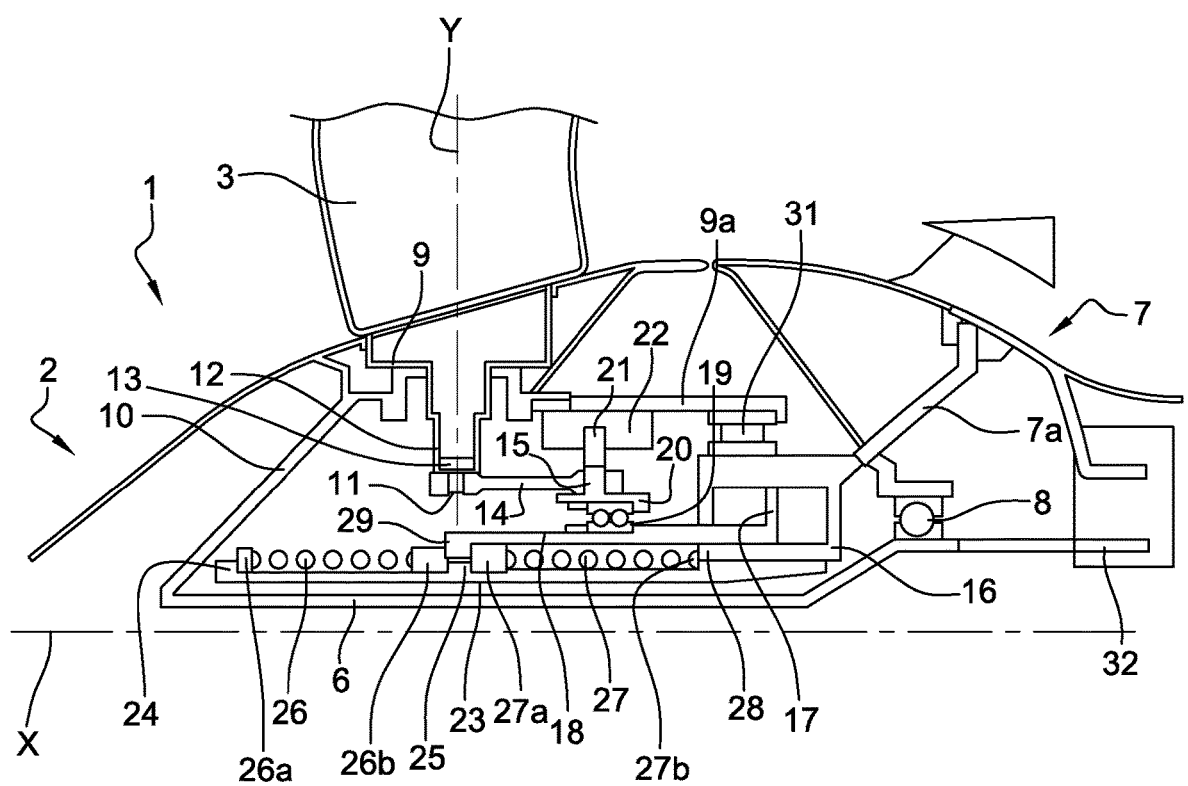
FIG. 6 shows a schematic axial section of a second embodiment of a device for adjusting the pitch of the rotor blades according to the invention, in the feathering position of the blades.

In a second embodiment, with reference to FIG. 6, the presence of the housing 16 of the cylinder, attached in front of the first bearing 8 holding the rotor 2 at the part 7a of the fixed casing 7, is used. Preferably, the housing 16 has an annular form, in particular for its external radial wall. A rear annulus 9b of the ring 9 supporting the blades is arranged so as to be connected to the external radial wall of the housing 16 of the hydraulic cylinder, by a bearing 31 enabling it to roll in rotation around this wall.

This bearing 31 is arranged radially between the housing 16 and the support ring 9. The inner race of the bearing 31 is carried by the housing 16 and the outer race is carried by the rear annulus 9b of the ring 9.

The bearing 31 is mounted so as to be reversed with respect to the bearing 8: the rotor 2 carries the outer race of the bearing 31 while it carries the inner race of the bearing 8 on the shaft 6.

Here the rotor 2, comprising the shaft 6, the conical connecting part 10 and the support ring 9 with the rear annulus 9a, forms a kind of pin inserted in the annular track 23 and surrounding the stator consisting of the fixed actuator as far as the chamber 16 of the cylinder, on the part 7a.

In this configuration, the rotor 2 is therefore entirely connected at its rear end to the fixed casing 7, by two reversed bearings connected to the same fixed structure part 7a. As before, the axial blocking function being provided by the first bearing 8, on the shaft 6, the second bearing 31 essentially provides, with a larger diameter, the transverse rotational holding of the rotor 2. It is therefore preferably formed with rolling bearings, so as not to cause axial overstressing.

This solution makes it possible to hold the fan 1 by a bearing 31 with a larger diameter than in the second embodiment, and therefore more stiffly. The latter point makes it possible to avoid impairing the functioning of the fan 1 by not making resonance modes appear in vibrations at low speed.

This embodiment provides an alternative to the first embodiment for providing a rigid holding of the rotor 2. Moreover, by using the housing 16 of the cylinder as a support for a second bearing 31 holding the rotor 2, this benefits from the presence of the structure 7a of the casing 7 already in place for holding the first bearing 8. The mass of the system is therefore also minimised and, by virtue of this rigid holding, it is possible also to increase the diameter of the rotor 2.

Moreover, in a variant embodiment that is not shown, it is possible to hold the fan rotor by one or more bearings connecting a flange axially extending towards the rear of the support ring 9 to a part of the fixed casing 7. In this way, the fan 1 can turn with respect to the casing 7 without requiring the bearings described in the previous embodiments in relation to the variable pitch and feathering system. The fan is held transversely and axially by the bearing 8 on the rotor shaft 6 and the other bearings, further away with respect to the rotation axis X.

The invention claimed is:

1. A fan module turning about an axis (X) having variable-pitch blades for a turbine engine, said fan module comprising a rotor carrying said blades, a fixed casing and a system for adjusting and controlling the pitch of the blades, the rotor comprising a central shaft and a ring supporting the blades surrounding the shaft, a front end of the ring being connected to a front end of the shaft so as to define, between the ring and the shaft, an annular space open towards the rear, said annular space of the rotor housing said system and the shaft being guided by a first bearing mounted in the fixed casing, behind the ring, characterised in that the ring is guided by at least one complementary bearing situated upstream of the first bearing with regards to rotation axis (X) and in that the system for adjusting and controlling the pitch of the blades comprises an actuator mounted on the fixed casing, said actuator comprising a housing supporting, on its external radial wall, an inner track of said complementary bearing connecting the external radial wall of the housing.

2. The fan module according to claim 1, wherein the housing is mounted on a same part of the fixed casing as the first bearing.

3. The fan module according to claim 1, wherein the housing forms a chamber inside which a piston can axially move, said piston driving a control part extending axially in front of the housing.

4. The fan module according to claim 1, wherein the system for adjusting and controlling the pitch of the blades comprises a mechanism for adjusting the pitch of the blades connected to the rotor, a control means comprising the actuator and a control part able to move in translation along a rotation axis (X) of the rotor, and a load transfer bearing between the control part and said mechanism.

5. The fan module according to claim 4, wherein the load transfer bearing is situated behind the blades.

6. The fan module according to claim 4, wherein the load-transfer bearing includes an internal track fixed to the control part and an external track fixed to a ring connected to the rotor.

7. The fan module according to claim 1, wherein the diameter of the complementary bearing is no more than the diameter of the ring.

8. The fan module according to claim 1, wherein the diameter of the complementary bearing is greater than the diameter of the first bearing.

9. The fan module according to claim 3, wherein a fixed annular track supports elastic return means arranged so as to exert an axial return force on the control part towards a given position, corresponding to a feathering position of the blades.

10. The fan module according to claim 3, wherein a fixed annular track is substantially tubular and wherein the control part slides around said fixed annular track along the rotation axis (X), the control part being linked to an internal radial periphery of the housing, and the control part extending axially forward along rotation axis (X) along the shaft.

11. The fan module according to claim 10, wherein the fixed annular track is fixed to the housing.

12. The fan module according to claim 1, wherein the first bearing includes ball bearings.

13. The fan module according to claim 1, wherein the module includes a substantially axial connecting rod mounted so to pivot on a stud at a point (A) on a crank in a direction substantially parallel to the axis (Y) of a pivot shaft.

14. A fan module turning about an axis (X) having variable-pitch blades for a turbine engine, said fan module comprising a rotor carrying said blades, a fixed casing and a system for adjusting and controlling the pitch of the blades, the rotor comprising a central shaft and a ring supporting the blades surrounding the shaft, a front end of the ring being connected to a front end of the shaft so as to define, between the ring and the shaft, an annular space open towards the rear, said annular space of the rotor housing said system and the shaft being guided by a first bearing mounted in the fixed casing, behind the ring, wherein the ring is guided by at least one complementary bearing situated upstream of the first bearing with regards to rotation axis wherein the system for adjusting and controlling the pitch of the blades comprises a mechanism for adjusting the pitch of the blades connected to the rotor, a control means comprising an actuator and a control part able to move in translation along a rotation axis of the rotor, and a load transfer bearing between the control part and said mechanism, wherein said actuator is mounted on the fixed casing, said actuator comprising a housing supporting, on its external radial wall, an inner track of said complementary bearing connecting the external radial wall of the housing, and wherein the load-transfer bearing includes an internal track fixed to the control part and an external track fixed to a ring connected to the fan rotor.

15. The fan module according to claim 2, wherein said housing comprises a piston connected to a control part, said housing surrounding the control part.

* * * * *